(12) United States Patent
Lim et al.

(10) Patent No.: US 12,548,804 B2
(45) Date of Patent: Feb. 10, 2026

(54) BATTERY PACK WITH MEASUREMENT BOARD

(71) Applicant: SAMSUNG SDI CO., LTD., Yongin-si (KR)

(72) Inventors: Dooyong Lim, Yongin-si (KR); Jangwoong Bae, Yongin-si (KR); Jisoon Lim, Yongin-si (KR); Kyungho Cho, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 600 days.

(21) Appl. No.: 17/055,880

(22) PCT Filed: Apr. 12, 2019

(86) PCT No.: PCT/KR2019/004408
§ 371 (c)(1),
(2) Date: Nov. 16, 2020

(87) PCT Pub. No.: WO2019/221396
PCT Pub. Date: Nov. 21, 2019

(65) Prior Publication Data
US 2021/0226261 A1  Jul. 22, 2021

(30) Foreign Application Priority Data
May 15, 2018  (KR) .................. 10-2018-0055653

(51) Int. Cl.
*H01M 10/00* (2006.01)
*H01M 10/42* (2006.01)
(Continued)

(52) U.S. Cl.
CPC ......... *H01M 10/425* (2013.01); *H01M 10/48* (2013.01); *H01M 10/482* (2013.01);
(Continued)

(58) Field of Classification Search
CPC .. H01M 10/425; H01M 10/48; H01M 10/482; H01M 50/204; H01M 50/209;
(Continued)

(56) References Cited

U.S. PATENT DOCUMENTS 6,304,062 B1  10/2001  Batson
8,802,275 B2   8/2014  Kim
(Continued)

FOREIGN PATENT DOCUMENTS

CN   103296321 A   9/2013
CN   104937432 A   9/2015
(Continued)

OTHER PUBLICATIONS

International Search Report dated Jul. 25, 2019 for PCT/KR2019/004408.
(Continued)

*Primary Examiner* — Nicholas P D'Aniello
(74) *Attorney, Agent, or Firm* — Lee IP Law, P.C.

(57) ABSTRACT

According to the present disclosure, a battery pack includes: a battery cell; and a measurement board configured to obtain state information of the battery cell, the measurement board including a measurement terminal which is arranged on a first surface of the battery cell and conductively connected to the first surface of the battery cell. According to the present disclosure, the battery pack has a structure improved for collecting state information such as battery cell voltages and temperatures, and thus manufacturing costs of the battery pack may be reduced.

18 Claims, 8 Drawing Sheets

(51) Int. Cl.
  *H01M 10/48* (2006.01)
  *H01M 50/204* (2021.01)
  *H01M 50/209* (2021.01)
  *H01M 50/50* (2021.01)
  *H01M 50/502* (2021.01)
  *H01M 50/569* (2021.01)

(52) U.S. Cl.
  CPC ....... *H01M 50/204* (2021.01); *H01M 50/209* (2021.01); *H01M 50/50* (2021.01); *H01M 50/502* (2021.01); *H01M 50/569* (2021.01)

(58) Field of Classification Search
  CPC .. H01M 50/50; H01M 50/502; H01M 50/569; H01M 10/4257; H01M 50/474; H01M 50/507; H01M 50/509; H01M 50/51; H01M 50/512; Y02E 60/10
  See application file for complete search history.

(56) References Cited

U.S. PATENT DOCUMENTS

| | | | |
|---|---|---|---|
| 9,024,572 B2 | 5/2015 | Nishihara et al. | |
| 9,444,086 B2 | 9/2016 | Shimizu et al. | |
| 9,515,356 B2 | 12/2016 | Zeng et al. | |
| 9,905,830 B2 | 2/2018 | Kim et al. | |
| 10,714,731 B2 * | 7/2020 | Matsumura | H01R 25/162 |
| 11,394,087 B2 * | 7/2022 | Erhart | H01M 10/486 |
| 2008/0097704 A1 | 4/2008 | Notten et al. | |
| 2009/0154048 A1 * | 6/2009 | Jang | H01M 10/425 |
| | | | 361/106 |
| 2010/0266887 A1 * | 10/2010 | Sekino | H01M 50/507 |
| | | | 429/123 |
| 2011/0024205 A1 * | 2/2011 | Nishihara | H01M 10/48 |
| | | | 429/90 |
| 2011/0244283 A1 * | 10/2011 | Seto | H01M 50/227 |
| | | | 429/91 |
| 2013/0252047 A1 | 9/2013 | Park et al. | |
| 2014/0017533 A1 | 1/2014 | Nishihara et al. | |
| 2014/0139185 A1 * | 5/2014 | Han | H01M 50/574 |
| | | | 320/118 |
| 2014/0193680 A1 | 7/2014 | Lee et al. | |
| 2015/0023392 A1 | 1/2015 | Noh | |
| 2015/0044511 A1 | 2/2015 | Kim et al. | |
| 2015/0295214 A1 | 10/2015 | Cho et al. | |
| 2015/0380779 A1 | 12/2015 | Kong et al. | |
| 2017/0084963 A1 | 3/2017 | Park | |
| 2018/0231614 A1 | 8/2018 | Vidal | |

FOREIGN PATENT DOCUMENTS

| | | |
|---|---|---|
| CN | 106654138 A | 5/2017 |
| EP | 1247304 A2 | 5/2001 |
| EP | 1856760 A1 | 7/2006 |
| JP | 2014-132585 A | 7/2014 |
| JP | 2014-186864 A | 10/2014 |
| JP | 2015-201274 A | 11/2015 |
| JP | 2016-054128 A | 4/2016 |
| JP | 2016-139616 A | 8/2016 |
| JP | 2017-152163 A | 8/2017 |
| KR | 10-2012-0003432 A | 1/2012 |
| KR | 10-2014-0090077 A | 7/2014 |
| KR | 10-2015-0018412 A | 2/2015 |
| KR | 10-1537457 B1 | 7/2015 |
| KR | 10-2015-0117015 A | 10/2015 |
| KR | 10-2016-0139807 A | 12/2016 |
| KR | 10-2017-0034675 A | 3/2017 |
| KR | 10-2017-0042407 A | 4/2017 |
| KR | 10-2018-0039526 A | 4/2018 |
| WO | WO 2014/135361 A1 | 9/2014 |
| WO | WO 2017/020129 A1 | 2/2017 |
| WO | WO2018-003437 A1 | 4/2018 |

OTHER PUBLICATIONS

European Search Report dated Jan. 12, 2022.
Japanese Office action dated Sep. 27, 2021.
Korean Office Action dated May 9, 2023 for corresponding Korean Patent Application No. 10-2018-0055653.
Chinese Office action dated Dec. 22, 2023.
Chinese Office action dated Jul. 31, 2024, for corresponding CN Patent Application No. 201980032360.0.

* cited by examiner

BATTERY PACK WITH MEASUREMENT BOARD

CROSS REFERENCE TO RELATED APPLICATIONS

This is the U.S. national phase application based on PCT Application No. PCT/KR2019/004408, filed Apr. 12, 2019, which is based on Korean Patent Application No. 10-2018-0055653, filed May 15, 2018, the entire contents of all of which are hereby incorporated by reference.

TECHNICAL FIELD

The present disclosure relates to a battery pack.

BACKGROUND ART

In general, secondary batteries refer to batteries that can be repeatedly charged and recharged unlike non-rechargeable primary batteries. Secondary batteries are used as energy sources of devices such as mobile devices, electric vehicles, hybrid vehicles, electric bicycles, or uninterruptible power supplies. Secondary batteries are individually used or secondary battery modules each including a plurality of secondary batteries connected as one unit are used according to the types of external devices using secondary batteries.

Unlike small mobile devices such as cellular phones each operable for a certain period of time using a single battery, devices such as electric vehicles or hybrid vehicles having long operation times and consuming large amounts of electricity may prefer battery modules (battery packs) each including a plurality of batteries to handle problems relating to power and capacity, and the output voltages or currents of battery modules may be increased by adjusting the number of batteries included in each battery module.

DESCRIPTION OF EMBODIMENTS

Technical Problem

An embodiment of the present disclosure includes a battery pack in which a structure for collecting state information such as battery cell voltages and temperatures is improved to reduce the manufacturing costs of the battery pack.

Solution to Problem

To solve the above problems and other problems, a battery pack of the present disclosure includes:
a battery cell; and
a measurement board configured to obtain state information of the battery cell, the measurement board comprising a measurement terminal which is arranged on a first surface of the battery cell and conductively connected to the first surface of the battery cell.

For example, the measurement terminal may be in contact with the first surface of the battery cell and may be electrically connected to the first surface of the battery cell.

For example, an electrode terminal may be formed on the first surface of the battery cell.

For example, the electrode terminal may include first and second electrode terminals having opposite polarities, and the first surface of the battery cell may be electrically connected to the first electrode terminal.

For example, the battery cell may include a plurality of battery cells arranged as an array,
the measurement board may further include a main body extending along an array of the plurality of battery cells, and
the measurement terminal may include a plurality of measurement terminals which branch off from the main body of the measurement board toward different battery cells and are spaced apart from each other.

For example, the plurality of measurement terminals may branch off side by side from the main body of the measurement board in an identical direction.

For example, the measurement terminals may be fewer than the plurality of battery cells.

For example, battery cells arranged adjacent to each other in the array of the plurality of battery cells may be connected in parallel to each other to form parallel modules, and
each of the measurement terminals may be conductively connected to the first surface of any one battery cell of each of the parallel modules.

For example, the battery cell may include a plurality of battery cells arranged as an array, and
the battery pack may further include a bus bar electrically connecting the plurality of battery cells to each other.

For example, the bus bar may electrically connect battery cells which are not adjacent to each other in the array of the plurality of battery cells.

For example, opposite polarities of the battery cells which are not adjacent to each other in the array of the plurality of battery cells may be connected in series to each other by the bus bar.

For example, a bus bar holder which is insulative may be arranged between the bus bar and the measurement board.

For example, the measurement board and the bus bar holder may be sequentially arranged above the first surfaces of the plurality of battery cells, and
a coupling hole may be formed through the bus bar holder such that access is allowed for a coupling tool to conductively connect the measurement terminal of the measurement board to the first surfaces of the plurality of battery cells.

For example, the coupling hole may correspond to a coupling position between the measurement terminal and the first surfaces of the plurality of the battery cells.

For example, the bus bar may include a plurality of bus bars, and the measurement board may further include a connection terminal branching off from a main body of the measurement board and electrically connected to a first bus bar of the plurality of bus bars.

For example, the first bus bar may be electrically connected to a first battery cell having a lowest negative-electrode voltage in the array of the plurality of battery cells.

For example, the first bus bar may be connected to an output terminal of the battery pack.

For example, a bus bar holder which is insulative may be arranged between the first bus bar and the measurement board, and
a through-hole may be formed through the bus bar holder to allow the connection terminal to pass through the through-hole.

For example, the connection terminal may include:
an extension portion bent from the main body of the measurement board and extending toward the first bus bar; and
a terminal portion bent from the extension portion and connected to the first bus bar.

For example, the connection terminal and the measurement terminal may branch off from the main body of the measurement board toward different battery cells and may be spaced apart from each other along the main body of the measurement board, the connection terminal and the main body of the measurement board may be arranged at different levels, and the measurement terminal may be arranged to be level with the main body of the measurement board.

For example, the connection terminal and the measurement terminal may branch off side by side from the main body of the measurement board in an identical direction.

Advantageous Effects of Disclosure

According to the present disclosure, the battery pack has a structure improved for collecting state information such as battery cell voltages and temperatures, and thus manufacturing costs of the battery pack may be reduced. According to an embodiment of the present disclosure, the width of the measurement board configured to collect state information of the battery pack is reduced to save a raw material of the measurement board. In addition, state information is measured directly from the first surfaces of the battery cells, thereby making it unnecessary to form additional connection structures on the bus bars which electrically connect the battery cells to each other, simplifying the structure of the bus bars, and making it possible to remove complex forming processes.

BEST MODE

A battery pack of the present disclosure includes:
a battery cell; and
a measurement board configured to obtain state information of the battery cell, the measurement board including a measurement terminal which is arranged on a first surface of the battery cell and conductively connected to the first surface of the battery cell.

MODE OF DISCLOSURE

Hereinafter, a battery pack will be described according to preferred embodiments of the present disclosure with reference to the accompanying drawings.

Figure 1:
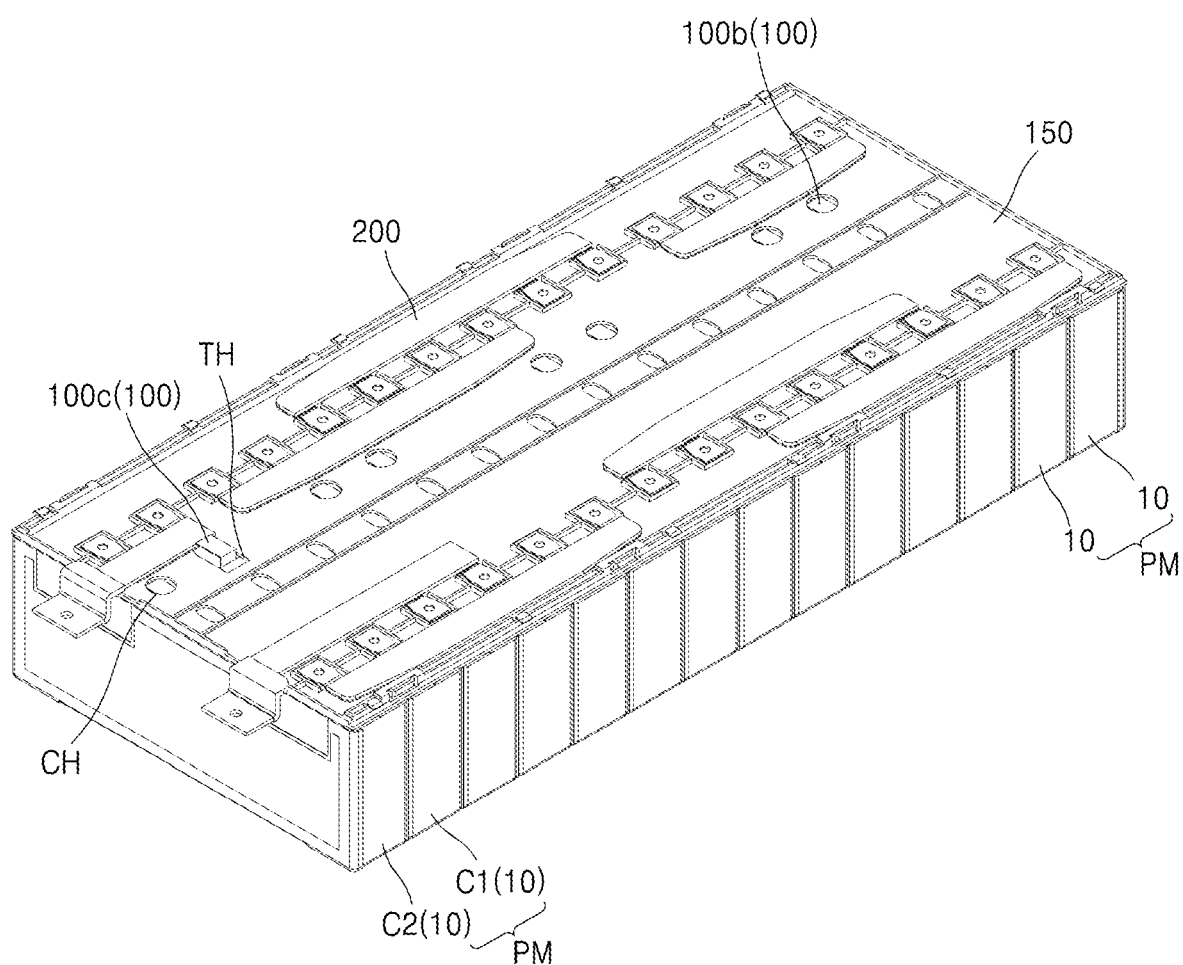
FIG. 1 is a perspective view illustrating a battery pack according to an embodiment of the present disclosure.
Figure 2:
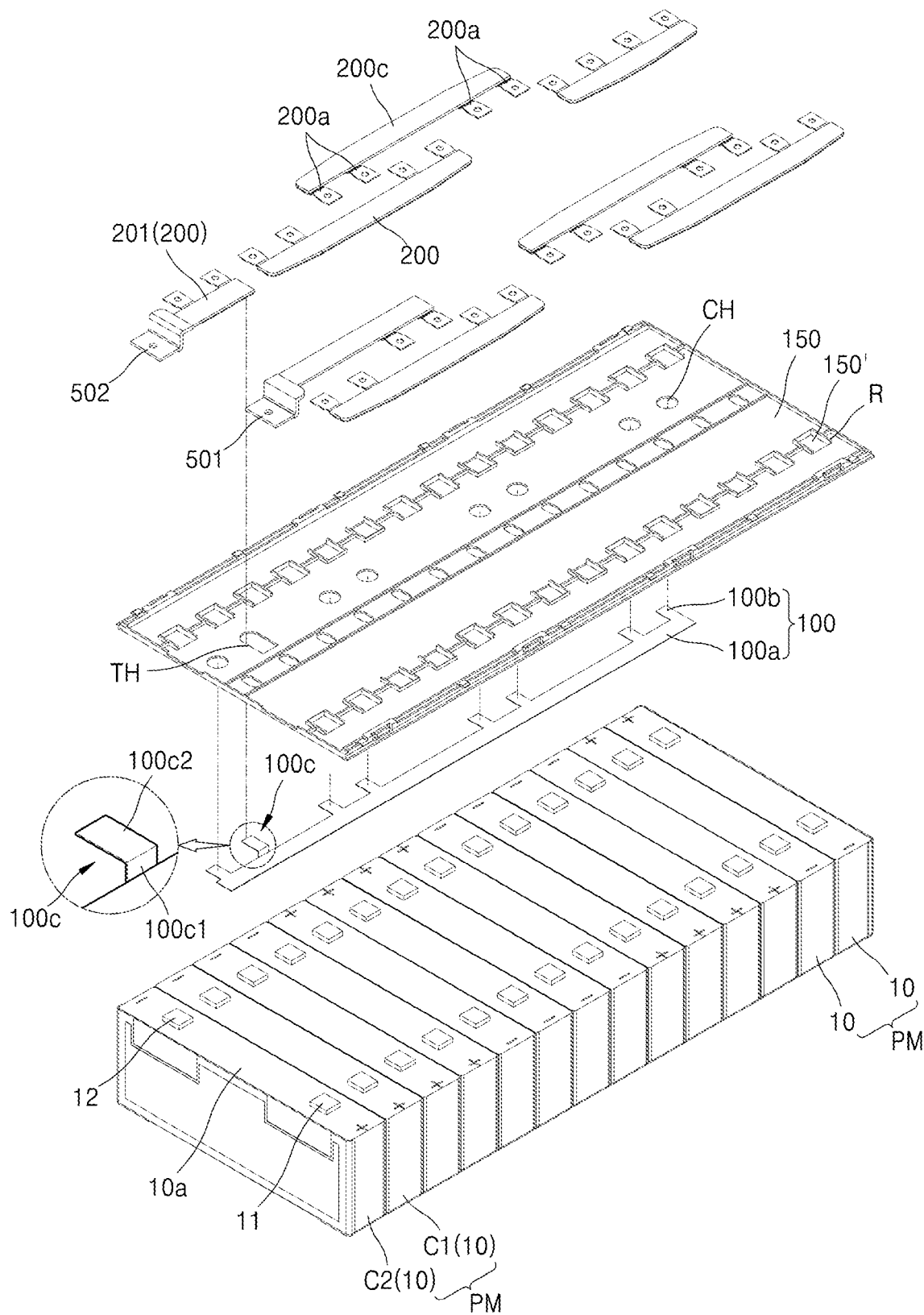
FIG. 2 is an exploded perspective view illustrating the battery pack shown in FIG. 1.
Figure 3:
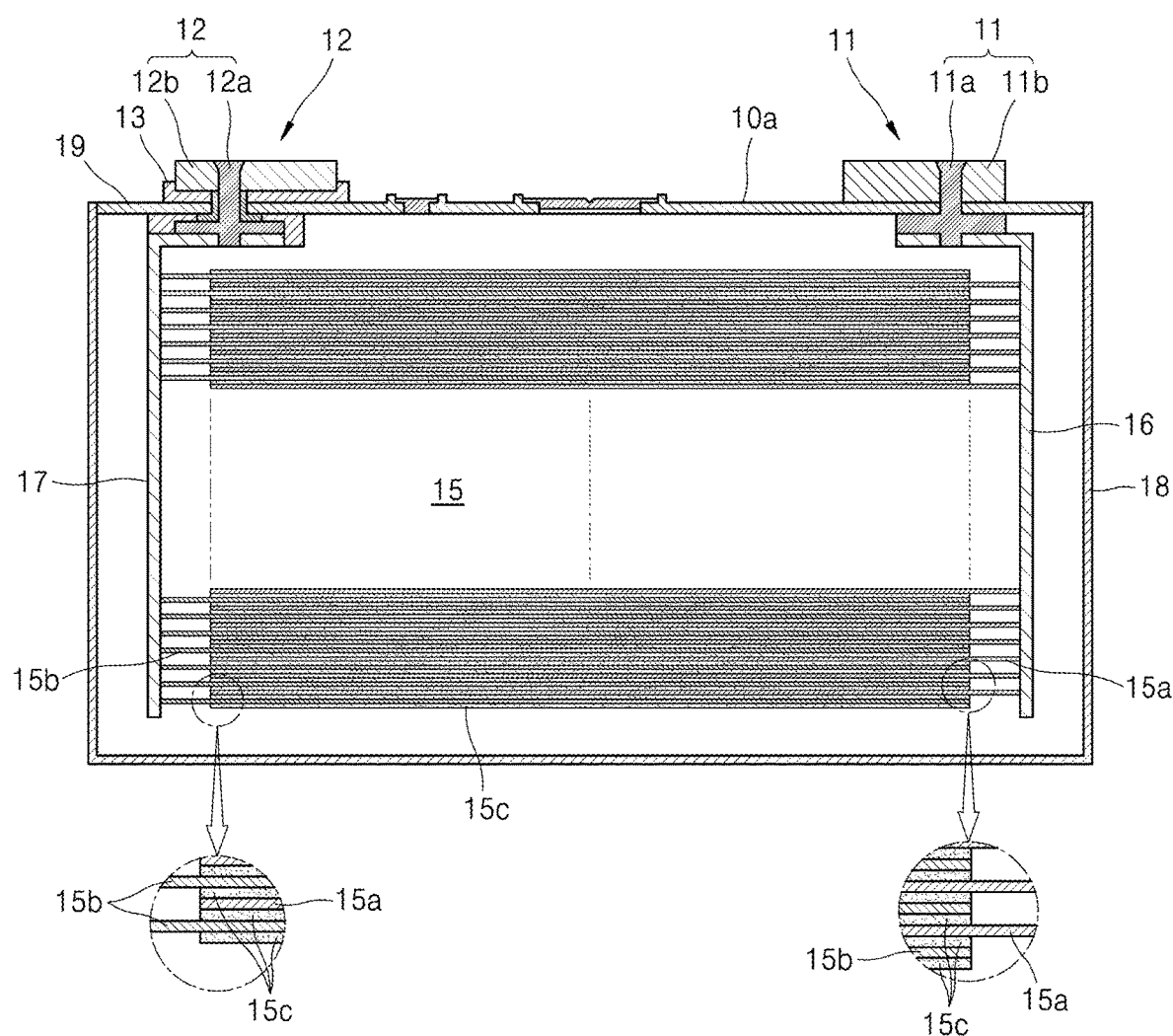
FIG. 3 is a view in which a battery cell shown in FIG. 1 is illustrated in more detail for explaining the structure of the battery cell.

FIG. 1 is a perspective view illustrating a battery pack according to an embodiment of the present disclosure. FIG. 2 is an exploded perspective view illustrating the battery pack shown in FIG. 1. FIG. 3 is a view in which a battery cell shown in FIG. 1 is illustrated in more detail for explaining the structure of the battery cell.

Referring to FIGS. 1 and 2, the battery pack of the present disclosure includes: a plurality of battery cells 10; bus bars 200 configured to electrically connect the plurality of battery cells 10 to each other; a measurement board 100 configured to measure state information such as voltage or temperature from the plurality of battery cells 10; and a bus bar holder 150 which provides electrical insulation between the bus bars 200 and the measurement board 100.

Referring to FIG. 3, each of the battery cells 10 may include: an electrode assembly 15 having first and second electrode plates 15a and 15b, and separators 15c arranged between the first and second electrode plates 15a and 15b; a can 18 having an open end to accommodate the electrode assembly 15; and a cap plate 19 coupled to the can 18 for seal the open end of the can 18 in which the electrode assembly 15 is accommodated.

First and second electrode terminals 11 and 12 electrically connected to the first and second electrode plates 15a and 15b may be formed on the cap plate 19. The first and second electrode terminals 11 and 12 may be coupled to the cap plate 19, wherein one of the first and second electrode terminals 11 and 12, for example, the first electrode terminal 11 may form a conductive connection with the cap plate 19, and the second electrode terminal 12 may form an insulative connection with the cap plate 19.

The first electrode terminal 11 may be in direct contact with the cap plate 19 to form a conductive connection with the cap plate 19, and in this case, the same voltage may be applied to the cap plate 19 and the first electrode terminal 11. In addition, the cap plate 19 which is conductively connected to the first electrode terminal 11 may have the same temperature as the inside of the battery cell 10 because the first electrode terminal 11 is connected to the electrode assembly 15 accommodated in the battery cell 10.

The cap plate 19 may form a first surface 10a of the battery cell 10 on which the electrode terminals 11 and 12 are formed, and state information such as the voltage and temperature of the battery cell 10 may be obtained from the cap plate 19, that is, the first surface 10a of the battery cell 10, which has the same voltage as the first electrode terminal 11 and the same temperature as the inside of the battery cell 10.

In an embodiment of the present disclosure, although the first and second electrode terminals 11 and 12 may be formed on the first surface 10a of the battery cell 10, the role of the first electrode terminal 11 may be substituted by the cap plate 19 because the cap plate 19 has the same voltage as the first electrode terminal 11. In this case, the first electrode terminal 11 may not be formed on the cap plate 19, and the cap plate 19 may replace the function of the first electrode terminal 11 and may have the voltage of the battery cell 10.

The second electrode terminal 12 may be coupled to the cap plate 19 with an insulating gasket 13 therebetween, and thus insulation between the cap plate 19 and the second electrode terminal 12 may be maintained. The insulating gasket 13 may be arranged between the cap plate 19 and the second electrode terminal 12 for insulation between the cap plate 19 and the second electrode terminal 12.

Referring to FIG. 3, the first and second electrode terminals 11 and 12 may respectively include: terminal rivets 11a and 12*a* which are inserted through the cap plate 19; and terminal plates 11*b* and 12*b* which are compressively coupled to upper ends of the terminal rivets 11*a* and 12*a*, wherein lead members 16 and 17 may be provided between the electrode assembly 15 and the terminal rivets 11*a* and 12*a* for electrical connection therebetween.

Referring to FIG. 2, the measurement board 100 may be used to measure state information such as the voltages or temperatures of the battery cells 10 directly from sides of the battery cells 10, for example, the first surfaces 10*a* of the battery cell 10. Here, the expression "the measurement board 100 directly measures state information such as voltage or temperature directly from the first surfaces 10*a* of the battery cells 10" means that the measurement board 100 is electrically connected to the first surfaces 10*a* of the battery cells 10 and acquires voltage signals directly from the first surfaces 10*a* of the battery cells 10, or is thermally connected to the first surfaces 10*a* of the battery cells 10 and acquires temperature signals directly from the first surfaces 10*a* of the battery cells 10.

In an embodiment of the present disclosure, the measurement board 100 may be electrically connected to the first surfaces 10*a* of the battery cells 10 to acquire voltage information from the battery cells 10 by measuring the voltages of the first surfaces 10*a* of the battery cells 10. For example, the voltage of one of the first and second electrode terminals 11 and 12 having opposite polarities may be applied to the first surface 10*a* of each of the battery cells 10, and for example, the voltage of the first electrode terminal 11 of each of the battery cells 10 may be applied to the first surface 10*a* of the battery cell 10. More specifically, the first surfaces 10*a* of the battery cells 10 may be electrically connected to the first electrode terminals 11 of the battery cells 10.

The bus bar holder 150 may be arranged between the measurement board 100 and the bus bars 200 to provide insulation therebetween. In addition, the bus bar holder 150 may provide insulation between the first surfaces 10*a* of the battery cells 10 and the bus bars 200. That is, as described later, the bus bar holder 150 may be arranged between each of the bus bars 200 and each of the first surfaces 10*a* of the battery cells 10 and the measurement board 100 (or measurement terminals 100*b*) which are in electrical contact with each other, thereby providing insulation between the bus bars 200 and the first surfaces 10*a* of the battery cells 10 and between the measurement board 100 and the bus bars 200.

The measurement board 100 may form a low-current path through which voltage signals measured from the first surfaces 10*a* of the battery cells 10 are transmitted, and the bus bars 200 may form a high-current path through which charge-discharge current of the battery cells 10 flows. In addition, the bus bar holder 150, which is insulative, may be arranged between the measurement board 100 forming the low-current path and the bus bars 200 forming the high-current path to provide insulation therebetween.

The bus bar holder 150 may provide insulation between the first surfaces 10*a* of the battery cells 10 and the bus bars 200 and may include terminal holes 150' formed therethrough such that the bus bars 200 may be coupled to the first and second electrode terminals 11 and 12 formed on the first surfaces 10*a* of the battery cells 10. Position alignment ribs R for aligning assembly positions of the bus bars 200 may be formed around the terminal holes 150' of the bus bar holder 150.

Figure 4:
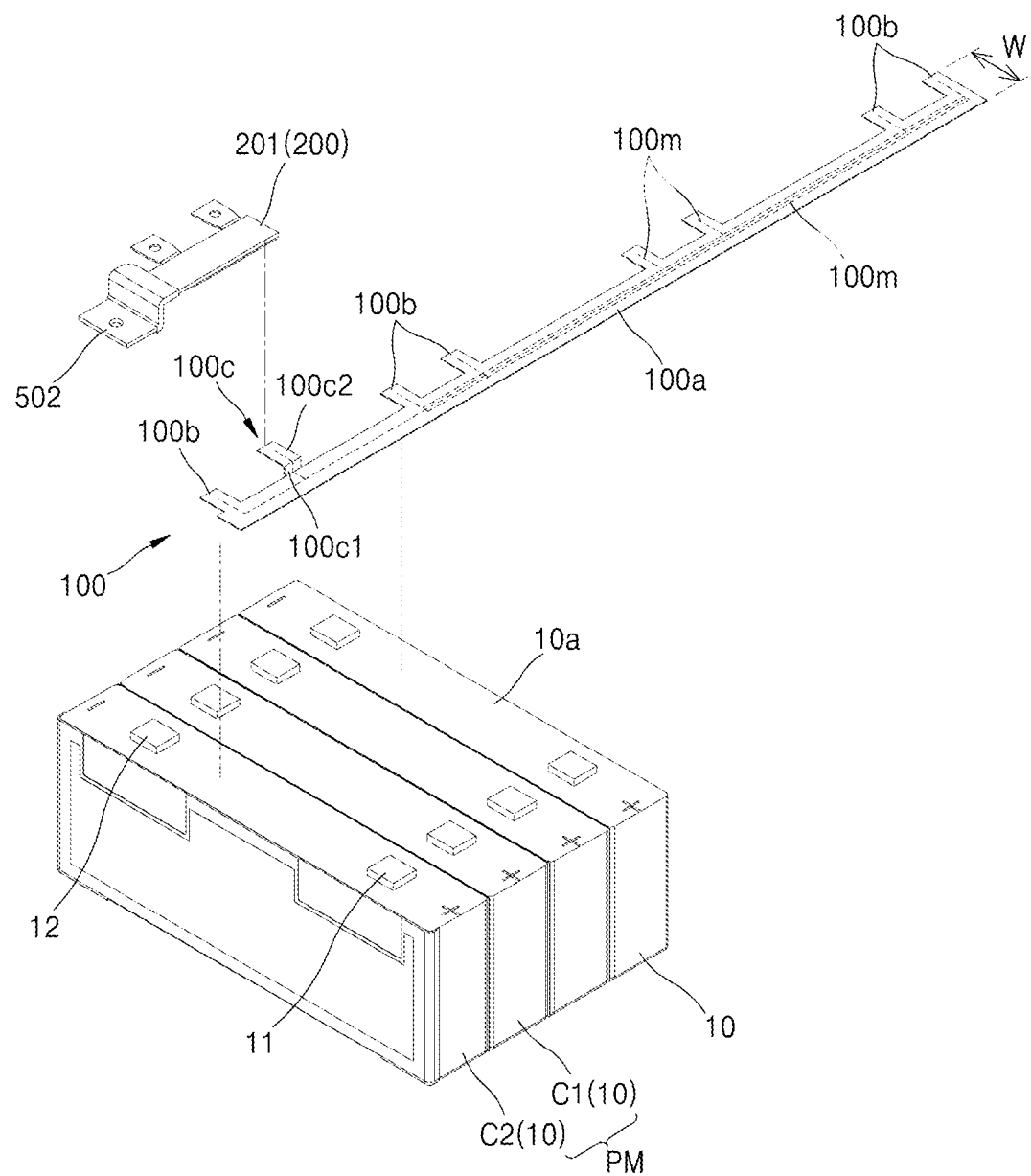
FIG. 4 is an enlarged perspective view in which the connection of a measurement board shown in FIG. 2 is illustrated.
Figure 5:
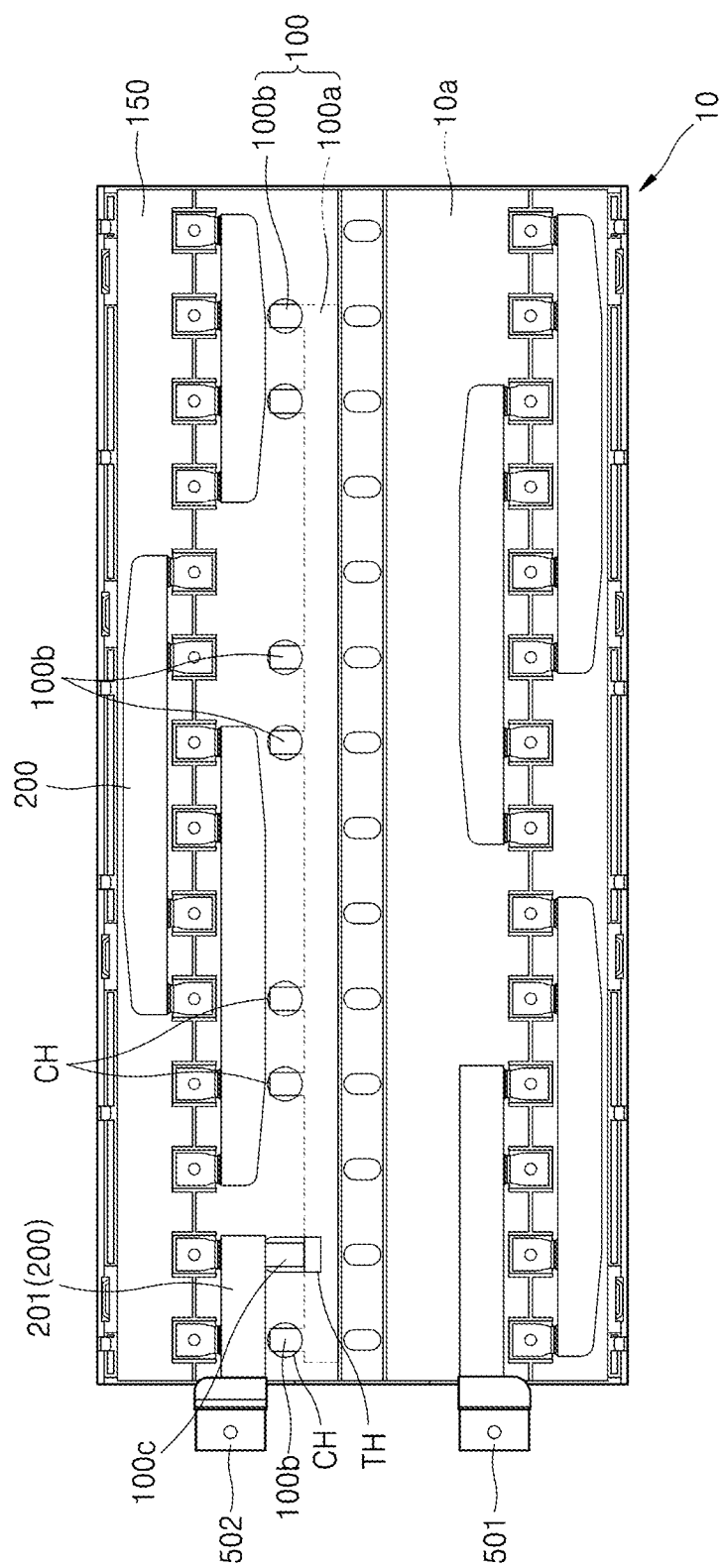
FIG. 5 is a view in which the battery pack shown in FIG. 2 is illustrated for explaining the connection of the measurement board.

FIG. 4 is an enlarged perspective view in which the connection of the measurement board shown in FIG. 2 is illustrated. FIG. 5 is a view in which the battery pack shown in FIG. 2 is illustrated for explaining the connection of the measurement board.

Referring to FIGS. 2 and 4, the measurement board 100 may be conductively connected to the plurality of battery cells 10 and may acquire voltage information or temperature information directly from the first surfaces 10*a* of the plurality of battery cells 10 through conductive connections with the first surfaces 10*a* of the plurality of battery cells 10.

The measurement board 100 may include: a main body 100*a* which extends across an array of battery cells 10; and a plurality of measurement terminals 100*b* which branch off from the main body 100*a* toward different battery cells 10 and are spaced apart from each other.

The measurement terminals 100*b* may branch off side by side in the same direction from the main body 100*a* of the measurement board 100 toward the first surfaces 10*a* of different battery cells 10. For example, the plurality of measurement terminals 100*b* may all be formed on one of the left and right sides of the main body 100*a* of the measurement board 100 but may not be distributed on both the left and right sides of the main body 100*a* of the measurement board 100. Here, a left-right direction may refer to a direction connecting the first and second electrode terminals 11 and 12 of a battery cell 10. The measurement terminals 100*b* are portions of the measurement board 100, and the branching directions in which the measurement terminals 100*b* branch off from the measurement board 100 may affect the left-right width of the measurement board 100.

In an embodiment of the present disclosure, the branching directions of the plurality of measurement terminals 100*b* may be one of the left and right directions such that left-right width W of the measurement board 100 may be reduced for saving a raw material of the measurement board 100. When the branching directions of the plurality of measurement terminals 100*b* are both the left and right directions, the left-right width W of the measurement board 100 increases, and higher costs may be incurred to form the measurement board 100.

The measurement board 100 may include a conductive pattern 100*m* and an insulating layer in which the conductive pattern 100*m* is buried for electrical insulation from the surrounding environment. For example, the measurement board 100 may be a flexible board having flexibility like a film. The measurement terminals 100*b* may form conductive connections with battery cells 10, and to this end, the measurement terminals 100*b* may be formed by portions of the conductive pattern 100*m* which are exposed from the insulating layer. The conductive pattern 100*m* may continuously extend across the measurement terminals 100*b* and the main body 100*a* of the measurement board 100, and the conductive pattern 100*m* exposed at the measurement terminals 100*b* may be surrounded by the insulating layer while extending in the main body 100*a* of the measurement board 100 such that the conductive pattern 100*m* may be insulated from the battery cells 10. For example, a high-temperature thermal coupling such as welding or soldering may be performed between lower sides of the measurement terminals 100*b* and the first surfaces 10*a* of the battery cells 10 by bringing a coupling tool (not shown) such as a welding tool or a soldering tool thereto from the upper side of the measurement terminals 100*b*, and to this end, the measurement terminals 100*b* may be formed by portions of the conductive pattern 100*m* exposed from the insulating layer.

Although not shown in FIGS. 2 and 4, a voltage signal of a battery cell 10 may be transmitted from a measurement terminal 100*b* through the main body 100*a* of the measurement board 100 to a connector (not shown) connected to an end of the measurement board 100, and may then be transmitted to a battery management system (not shown) from the connector. The battery management system (not shown) may control the charge-discharge operations of the battery cells 10 based on voltage signals or temperature signals obtained through the measurement board 100.

The measurement terminals 100*b* of the measurement board 100 may form conductive connections with the first surfaces 10*a* of battery cells 10. That is, the measurement terminals 100*b* may be directed to directly face the first surfaces 10*a* of battery cells 10 and may be placed on the first surfaces 10*a* of the battery cells 10 to form conductive connections with the first surfaces 10*a*. Here, the expression "the measurement terminals 100*b* directly face the first surfaces 10*a* of battery cells 10" may mean that the measurement terminals 100*b* directly face the first surfaces 10*a* of the battery cells 10 without any other elements arranged between the measurement terminals 100*b* and the first surfaces 10*a* of the battery cells 10. For example, the measurement terminals 100*b* may be brought into direct contact with the first surfaces 10*a* of the battery cells 10 and may be directly coupled to the first surfaces 10*a* of the battery cells 10.

Referring to FIGS. 2, 4, and 5 together, the measurement terminals 100*b* may be conductively connected to the first surfaces 10*a* of the battery cells 10 through a high-temperature thermal coupling such as welding or soldering. The process of conductive connecting the measurement terminals 100*b* to the first surfaces 10*a* of the battery cells 10 may be performed through coupling holes CH formed through the bus bar holder 150. That is, the bus bar holder 150 may be arranged on the measurement board 100 including the measurement terminals 100*b*, and in this case, the bus bar holder 150 may have the coupling holes CH which allow the conductive connection process between the measurement terminals 100*b* and the first surfaces 10*a* of the battery cells 10. The coupling holes CH may allow a coupling tool (not shown) such as a welding tool or a soldering tool to access the measurement terminals 100*b*, and thus it may be possible to couple the measurement terminals 100*b* to the first surfaces 10*a* of the battery cells 10. The coupling holes CH may correspond to the positions of coupling, that is, welding or soldering, between the measurement terminals 100*b* and the first surfaces 10*a* of the battery cells 10.

The measurement board 100 may be brought into tight contact with the first surfaces 10*a* of the battery cells 10 to form conductive connections, that is, conductive contacts with the first surfaces 10*a* of the battery cells 10, and to this end, the bus bar holder 150 may push the measurement board 100 against the first surfaces 10*a* of the battery cells 10 such that the measurement board 100 may be brought into tight contact with the first surfaces 10*a* of the battery cells 10. Although not shown in FIGS. 2 and 4, the bus bar holder 150 may be coupled to side plates (not shown) that extend across lateral sides of the battery cells 10, such that the measurement board 100 arranged under the bus bar holder 150 may be pushed against the first surfaces 10*a* of the battery cells 10 by the bus bar holder 150.

Figure 6:
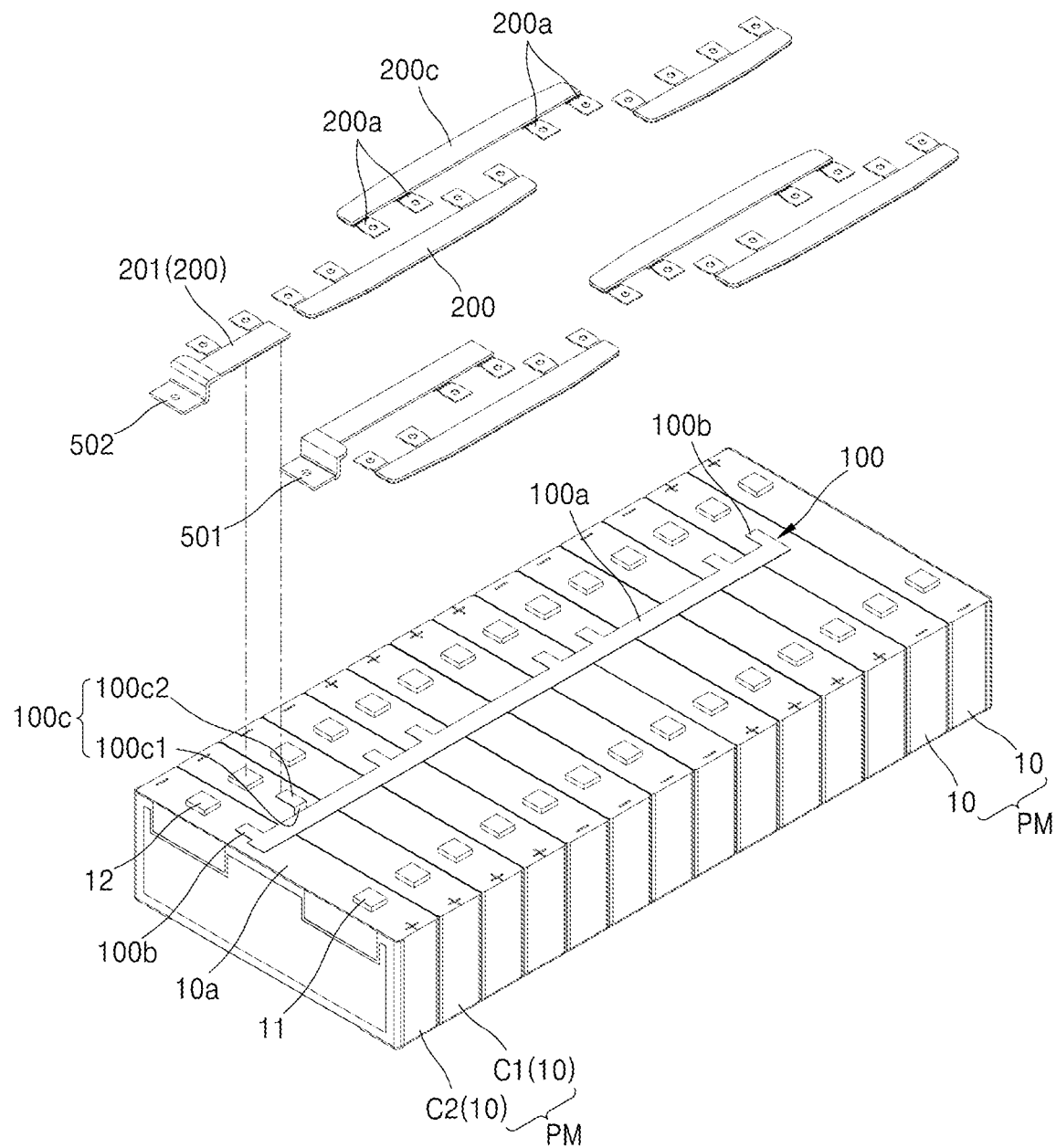
FIG. 6 is a perspective view corresponding to a portion of FIG. 2 for illustrating the electrical connection of a plurality of battery cells shown in FIG. 2.

FIG. 6 is a perspective view corresponding to a portion of FIG. 2 for illustrating the electrical connection of the plurality of battery cells shown in FIG. 2.

Referring to FIGS. 2 and 6, the bus bars 200 may be arranged on the bus bar holder 150 for electrically connecting the plurality of battery cells 10 to each other. The bus bars 200 may electrically connect the plurality of battery cells 10 to each other and may form a current path through which charge-discharge current flows.

In an embodiment of the present disclosure, the bus bars 200 may electrically connect battery cells 10 that are not adjacent to each other, and thus, output terminals 501 and 502 for outputting the voltage of the battery pack may all be provided on one side of the battery pack. That is, in an embodiment of the present disclosure, the output terminals 501 and 502 of the battery pack, that is, first and second output terminals 501 and 502, may not be separately formed on one side and the other side of the battery pack, but may all be formed on one side of the battery pack.

More specifically, a bus bar 200 may connect a pair of adjacent battery cells 10 in parallel to each other by connecting the same polarities of the pair of adjacent battery cells 10, and the pair of adjacent battery cells 10 connected in parallel to each other may form a parallel module PM. In an embodiment of the present disclosure, a parallel module PM may be formed by connecting a pair of adjacent battery cells 10 in parallel to each other, and in another embodiment of the present disclosure, a parallel module PM may be formed by connecting three or more adjacent battery cells 10 in parallel to each other.

A pair of battery cells 10 (a parallel module PM) connected in parallel to each other may be connected by a bus bar in series to another pair of battery cells 10 (another parallel module PM) connected in parallel to each other. In this case, the pair of parallel-connected battery cells 10 (a parallel module PM) and the other pair of parallel connected battery cells 10 (another parallel module PM), which are electrically connected (in series) to each other by the bus bar 200, may not be adjacent to each other. As described above, battery cells 10 not adjacent to each other, that is, parallel modules PM not adjacent to each other are connected in series to each other such that the first and second output terminals 501 and 502 of the battery pack may all be formed on one side of the battery pack.

Each of the bus bars 200 may include: branch portions 200*a* configured to connect a pair of adjacent battery cells 10 (a parallel module PM) in parallel to each other; other branch portions 200*a* configured to connect another pair of adjacent battery cells 10 (another parallel module PM) in parallel to each other; and a connection portion 200*c* connecting the branch portions 200*a* to connect the pair of adjacent battery cells 10 (a parallel module PM) in series to the other pair of adjacent battery cells 10 (another parallel module PM). The pair of adjacent battery cells 10 (a parallel module PM) and the other pair of neighboring battery cells 10 (another parallel module PM) which are targets to be connected by the connection portion 200*c* may be arranged at positions which are not adjacent to each other.

The measurement terminals 100*b* branch off from the main body 100*a* of the measurement board 100 toward different battery cells 10 of the array of battery cells 10 to collect state information from the different battery cells 10. The measurement terminals 100*b* may be formed at positions such that each of the measurement terminals 100*b* may be conductively connected to one of a pair of parallel-connected battery cells 10 (parallel module PM). That is, since a pair of parallel-connected battery cells 10 (parallel module PM) share the same voltage, it is not necessary to connect measurement terminals 100*b* respectively to the parallel-connected battery cells 10 forming the parallel module PM, and thus a measurement terminal 100*b* may be connected to only one battery cell 10 of the pair of parallel-connected battery cells 10 (parallel module PM) for simplifying the structure of the measurement board 100 and reducing manufacturing costs. Therefore, the number of measurement terminals 100b branching off from the main body 100a of the measurement board 100 may be reduced.

In an embodiment of the present disclosure, the number of measurement terminals 100b may be less than the total number of battery cells 10 (the number of measurement terminals 100b<the number of battery cells 10), and the number of measurement terminals 100b may be adjusted to obtain the configuration in which one measurement terminal 100b corresponds to one voltage instead of obtaining the configuration in which measurement terminals 100b respectively correspond to different battery cells 10 sharing the same voltage.

A plurality of bus bars 200 may be provided along the array of battery cells 10 to electrically connect the battery cells 10. In this case, the measurement board 100 may include a connection terminal 100c electrically connected to a first bus bar 201 of the plurality of bus bars 200. That is, the connection terminal 100c is conductively connected to the first bus bar 201 instead of being conductively connected to the first surface 10a of a battery cell 10. The connection terminal 100c may not be in contact with the first surface 10a of a battery cell 10 but may be in direct contact with the first bus bar 201.

In an embodiment of the present disclosure, the connection terminal 100c, which is for measuring the lowest negative-electrode voltage of the voltages of the plurality of battery cells 10 (hereinafter referred to as the lowest negative-electrode voltage), may be directly connected to the first bus bar 201 connected to a first battery cell C1. For example, a negative electrode of the first battery cell C1 forming the lowest negative-electrode voltage, for example, the second electrode terminal 12 of the first battery cell C1, may be connected to the first bus bar 201 and thus to the measurement board 100 through the connection terminal 100c conductively connected to the first bus bar 201. The first bus bar 201 to which the lowest negative-electrode voltage is applied may be connected to the first and second output terminals 501 and 502 of the battery pack, for example, to the second output terminal 502.

The connection terminal 100c of the measurement board 100 is connected to the first bus bar 201 connected to the first battery cell C1, and along with this, a measurement terminal 100b may be connected to the first surface 10a of a second battery cell C2 which is connected in parallel to the first battery cell C1 to form a parallel module PM. The first and second battery cells C1, C2 sharing a voltage may form a parallel module PM, wherein a negative-side voltage of the parallel module PM (the voltage of the second electrode terminals 12) is measured through the connection terminal 100c, and a positive-side voltage of the parallel module PM (the voltage of the first electrode terminals 11) is measured through the measurement terminal 100b. That is, in a parallel module PM in the array of battery cells 10, the connection terminal 100c and the measurement terminal 100b may be respectively to the first and second battery cells C1 and C2 forming the parallel module PM. More specifically, the connection terminal 100c may be connected to the first bus bar 201 connected to the first battery cell C1 and the measurement terminal 100b may be connected to the first surface 10a of the second battery cell C2.

The measurement board 100 may include the plurality of measurement terminals 100b in addition to including the connection terminal 100c, wherein the measurement terminals 100b may be conductively connected to the first surfaces 10a of battery cells 10 to measure positive-electrode voltages (the voltages of the first electrode terminals 11), and the connection terminal 100c may be conductively connected to the first bus bar 201 connected to the first battery cell C1 to measure a lowest negative-electrode voltage.

The total voltage difference of the battery pack, that is, the output voltage of the battery pack, may be calculated by adding up the positive-electrode voltages of the battery pack measured through the measurement terminals 100b based on the lowest negative-electrode voltage measured through the connection terminal 100c. For example, the output voltage may correspond to a voltage between the first and second output terminals 501 and 502. The connection terminal 100c may be conductively connected to the first bus bar 201 connected to the first battery cell C1 having the lowest negative-electrode voltage to calculate the output voltage of the battery pack.

Referring to FIGS. 4 and 6 together, the connection terminal 100c may be formed in a form lifted toward the first bus bar 201 by bending the connection terminal 100c from the main body 100a of the measurement board 100, wherein the connection terminal 100c may include: an extension portion 100c1 which is bent from the main body 100a of the measurement board 100 and extends upward; and a terminal portion 100c2 which is bent from the extension portion 100c1 and connected to the first bus bar 201.

The connection terminal 100c and the measurement terminals 100b may branch off from the main body 100a of the measurement board 100 toward different battery cells 10 and may be apart from each other along the main body 100a of the measurement board 100. In this case, the connection terminal 100c may be arranged at a level different from the level of the main body 100a of the measurement board 100, whereas the measurement terminals 100b may be arranged at the same level as the level of the main body 100a of the measurement board 100. That is, the connection terminal 100c, which is bent to be lifted toward the first bus bar 201, may be different in shape from the measurement terminals 100b in that the measurement terminals 100b are arranged on the same plane as the main body 100a of the measurement board 100 and are conductively connected to the first surfaces 10a of the battery cells 10.

The connection terminal 100c and the measurement terminals 100b may branch off side by side in the same direction from the main body 100a of the measurement board 100. That is, all the connection terminal 100c and the measurement terminals 100b may be formed on one of the left and right sides of the main body 100a of the measurement board 100, and the branching direction of the connection terminal 100c and the measurement terminals 100b may be one of the left and right directions. When the connection terminal 100c and the measurement terminal 100b branch off in both the left and right directions instead of branching off in one of the left and right directions, the total left-right width W of the measurement board 100 including the connection terminal 100c and the measurement terminals 100b may increase, and thus costs for a raw material of the measurement board 100 may increase.

Referring to FIGS. 2, 5, and 6 together, the connection terminal 100c may be connected to the first bus bar 201 through a through-hole TH of the bus bar holder 150. For example, the extension portion 100c1 of the connection terminal 100c may extend toward the first bus bar 201 through the through-hole TH of the bus bar holder 150, and the connection terminal 100c and the first bus bar 201 may be coupled to each other through the terminal portion 100c2 connected to the first bus bar 201 in an overlapping manner.

The bus bar holder 150 may be arranged between the measurement board 100 and the first bus bar 201, and the connection terminal 100c extending from the main body 100a of the measurement board 100 through the through-hole TH of the bus bar holder 150 may be connected to first bus bar 201.

The bus bar holder 150 may include the plurality of coupling holes CH in addition to including the through-hole TH. The through-hole TH is for allowing the connection terminal 100c to pass therethrough and may correspond to a coupling position between the connection terminal 100c and the first bus bar 201, whereas the coupling holes CH are for allowing a coupling tool (not shown) to access the measurement terminals 100b for conductively connecting the measurement terminals 100b to the first surfaces 10a of the battery cells 10 and may correspond to coupling positions between the measurement terminals 100b and the first surfaces 10a of the battery cells 10.

Referring to FIG. 4, like the measurement terminals 100b, the connection terminal 100c may be formed by a portion of the conductive pattern 100m exposed from the insulating layer, and the conductive pattern 100m exposed at the connection terminal 100c may be surrounded by the insulating layer in a buried form while extending in the main body 100a of the measurement board 100.

Figure 7:
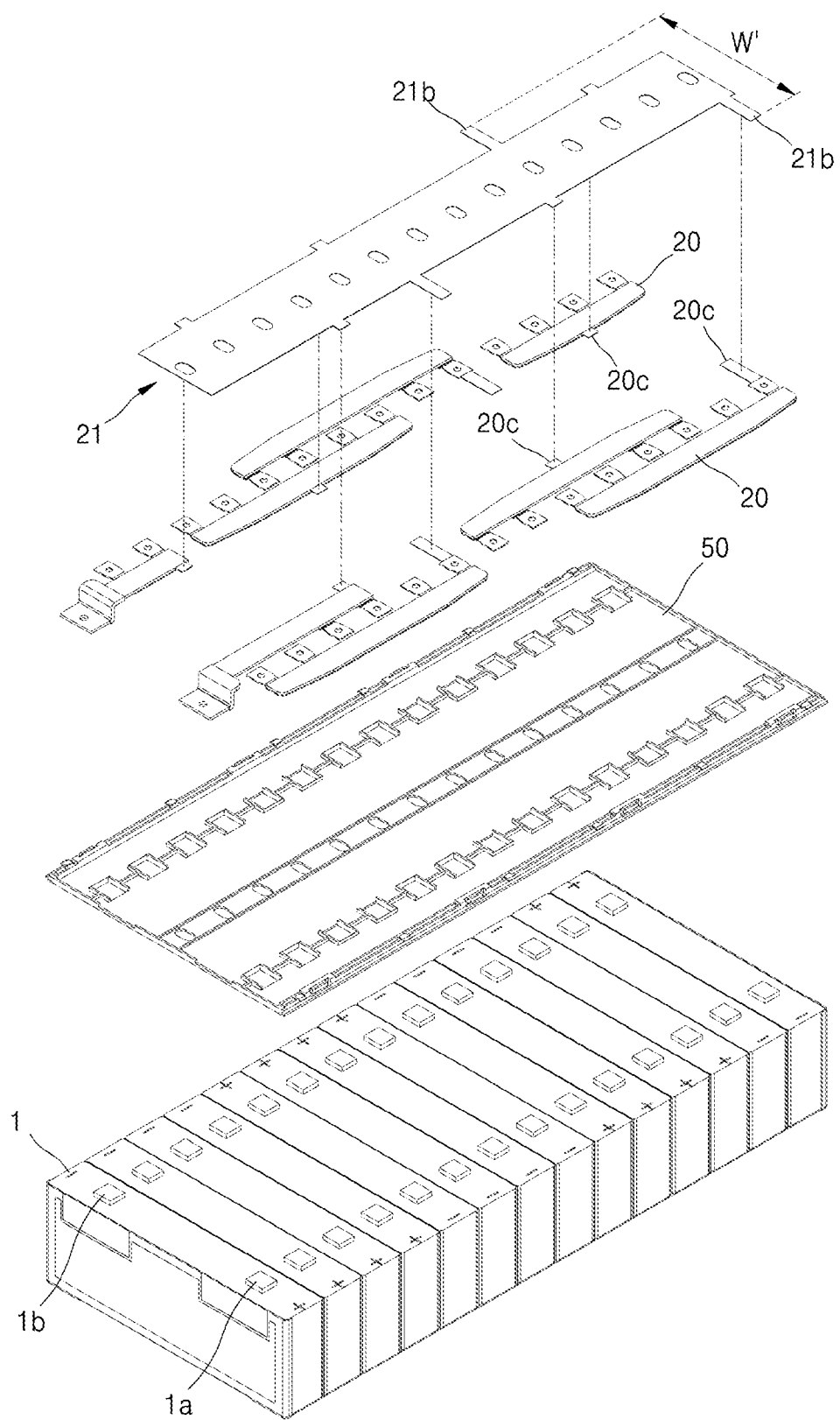
FIG. 7 is a perspective view illustrating a battery pack according to a comparative example for comparison with the present disclosure.
Figure 8:
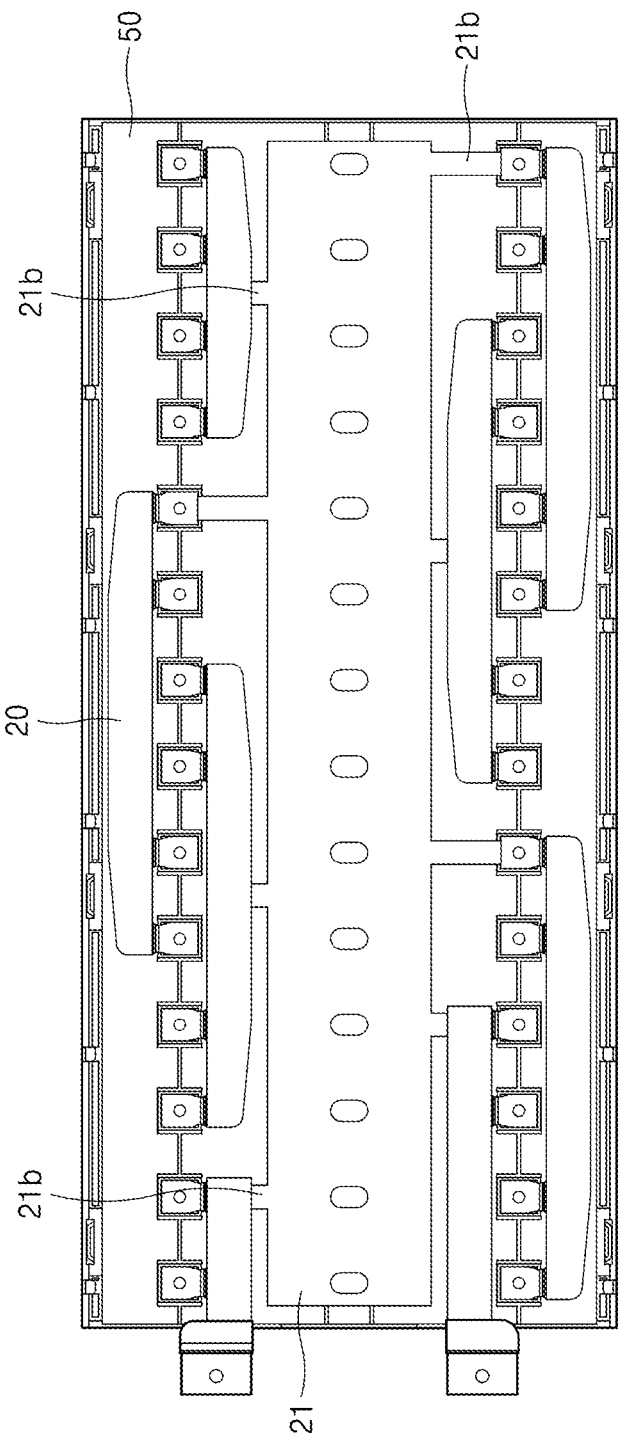
FIG. 8 is a view illustrating the connection of a measurement board shown in FIG. 7.

FIG. 7 is a perspective view illustrating a battery pack according to a comparative example for comparison with the present disclosure. FIG. 8 is a view illustrating the connection of a measurement board shown in FIG. 7.

According to the comparative example for comparison with the present disclosure, the battery pack may include: a plurality of battery cells 1; bus bars 20 configured to electrically connect the battery cells 1; and a measurement board 21 configured to be connected to the bus bars 20 for obtain state information such as the voltages or temperatures of the battery cells 1, wherein a bus bar holder 50 may be arranged between the battery cells 1 and the bus bars 20 to provide insulation therebetween.

According to the comparative example for comparison with the present disclosure, information about the voltages of the battery cell 1 is obtained through the bus bars 20, and to this end, the measurement board 21 is connected to the bus bars 20. Therefore, the bus bars 20 need to include additional protrusion portions 20c for connection with the measurement terminals 21b of the measurement board 21, and since the measurement terminals 21b branch off from the measurement board 21 toward the bus bars 20 arranged on both the left and right sides of the battery cells 10, it is necessary to increase the left-right width W of the measurement board 21.

That is, according to the comparative example for comparison with the present disclosure, the bus bars 20 need to include the protrusion portions 20c for connection with the measurement board 21 (more specifically, the measurement terminals 21b), and thus the bus bars 20 has a complex structure and incurs high manufacturing costs for forming the protrusion portions 20c. For example, to form the bus bars 20 each including the protrusion portion 20c formed in one piece with the bus bar 20, it is necessary to cut off portions other than the protrusion portions 20c from a raw material of the bus bars 20, thereby wasting a large amount of metal scrap, that is, wasting the raw material of the bus bars 20, and incurring additional process costs for forming the bus bars 20. In addition, since the measurement terminals 21b of the measurement board 21 need to be connected to the bus bars 20 arranged on both left and right sides, the left-right width W of the measurement board 21 increases, and thus costs for the raw material of the measurement board 21 increase. Here, a left-right direction may refer to a direction connecting first and second electrode terminals 1a and 1b of a battery cell 10. For example, to increase the left-right width W of the measurement board 21, it is needed to cut off unnecessary portions from a raw material having a relatively left-right wide, and thus the raw material may be wasted.

As shown in FIG. 4, according to the present disclosure, the measurement terminals 100b of the measurement board 100 are not connected to the bus bars 200 but are directly connected to the first surfaces 10a of the battery cells 10, and thus the measurement terminals 100b may branch off side by side toward one of the left and right sides instead of branching off toward both the left and right sides at which the bus bars 200 are arranged. Therefore, according to the present disclosure, the left-right width W of the measurement board 100 may be reduce, and costs for the raw material of the measurement board 100 may be reduced. Furthermore, since the measurement terminals 100b are not connected to the bus bars 200 as shown in FIG. 2, it is not necessary to form protrusion portions on the bus bars 200 for connection with the measurement terminals 100b, and thus the bus bars 200 may have a smooth external shape without such protrusion portions. In addition, additional portion costs may not be incurred to remove a large amount of metal scrap after forming the bus bars 200, and a raw material of the bus bars 200 may not be wasted due to a large amount of metal scrap. Quantitatively, the width W of the measurement board 100 of the present disclosure may be reduced to about 75% of the width W of the measurement board 21 of the comparative example.

While embodiments of the present disclosure have been described with reference to the accompanying drawings, the embodiments are for illustrative purposes only, and it will be understood by those of ordinary skill in the art that various modifications and equivalent other embodiments may be made therefrom.

INDUSTRIAL APPLICABILITY

The present disclosure may be applied to battery packs which are rechargeable energy sources.

The invention claimed is:
1. A battery pack, comprising:
a plurality of battery cells;
a measurement board including protrusions only on a first side of the measurement board and configured to obtain state information of the plurality of battery cells, the measurement board including a measurement terminal that is on a first surface of a battery cell of the plurality of battery cells; a plurality of bus bars; and an insulating bus bar holder between the plurality of bus bars and the measurement board, the measurement board further including a connection terminal that branches off from a main body of the measurement board and is electrically connected to a first bus bar of the plurality of bus bars, wherein:
the plurality of battery cells are arranged as an array of battery cells, and
the battery pack includes the first bus bar that electrically connects the plurality of battery cells to each other; and
wherein the connection terminal includes:
a flat extension portion that is bent from and is perpendicular to the main body of the measurement board and extends toward the first bus bar; and a flat terminal portion that is bent from the extension portion and is connected to the first bus bar, the terminal portion being perpendicular to the extension portion and is parallel to and spaced from the main body, the extension portion and the terminal portion being on two different perpendicular planes, wherein the measurement terminal is in contact with the first surface of the battery cell and is electrically connected to the first surface of the battery cell, and wherein the measurement terminal is not in contact with an electrode terminal of the battery cell.

2. The battery pack of claim 1, wherein an electrode terminal is on the first surface of the battery cell.

3. The battery pack of claim 2, wherein:
the electrode terminal includes first and second electrode terminals having opposite polarities, and
the first surface of the battery cell is electrically connected to the first electrode terminal.

4. The battery pack of claim 2, wherein the electrode terminal and the first surface have a same voltage.

5. The battery pack of claim 1, wherein:
the main body of the measurement board extends along the array of battery cells, and
the measurement terminal includes a plurality of measurement terminals that branch off from the main body of the measurement board toward different battery cells of the array of battery cells and are spaced apart from each other.

6. The battery pack of claim 5, wherein the plurality of measurement terminals branch off side by side from the main body of the measurement board in an identical direction.

7. The battery pack of claim 5, wherein the plurality of measurement terminals are fewer in number than the plurality of battery cells.

8. The battery pack of claim 7, wherein:
battery cells arranged adjacent to each other in the array of battery cells are connected in parallel to each other to form parallel modules, and
each of the measurement terminals is conductively connected to the first surface of any one battery cell of each of the parallel modules.

9. The battery pack of claim 1, wherein the first bus bar electrically connects battery cells that are not adjacent to each other in the array of battery cells.

10. The battery pack of claim 9, wherein opposite polarities of the battery cells that are not adjacent to each other in the array of battery cells are connected to each other in series by the bus bar.

11. The battery pack of claim 1, wherein:
the measurement board and the bus bar holder are sequentially arranged above first surfaces of the plurality of battery cells, and
a coupling hole is formed through the bus bar holder such that access is allowed for a coupling tool to conductively connect the measurement terminal of the measurement board to the first surfaces of the plurality of battery cells.

12. The battery pack of claim 11, wherein the coupling hole corresponds to a coupling position between the measurement terminal and the first surfaces of the plurality of battery cells.

13. The battery pack of claim 1, wherein the first bus bar is electrically connected to a first battery cell having a lowest negative-electrode voltage in the array of battery cells.

14. The battery pack of claim 13, wherein the first bus bar is connected to an output terminal of the battery pack.

15. The battery pack of claim 1, further comprising the insulating bus bar holder between the first bus bar and the measurement board,
wherein a through-hole extends through the bus bar holder to allow the connection terminal to pass through the through-hole.

16. The battery pack of claim 1, wherein:
the connection terminal and the measurement terminal branch off from the main body of the measurement board toward different battery cells, and are spaced apart from each other along the main body of the measurement board,
the connection terminal and the main body of the measurement board are at different levels, and
the measurement terminal is level with the main body of the measurement board.

17. The battery pack of claim 1, wherein the connection terminal and the measurement terminal branch off side by side from the main body of the measurement board in an identical direction.

18. The battery pack of claim 1, wherein a width of each of the extension portion and the terminal portion in a longitudinal direction of the main body is larger than its thickness.

* * * * *